April 14, 1942. T. F. BANIGAN ET AL 2,280,022
METHOD AND APPARATUS FOR MOLDING A CELLULOSIC STRUCTURE
Filed June 15, 1937 2 Sheets-Sheet 1
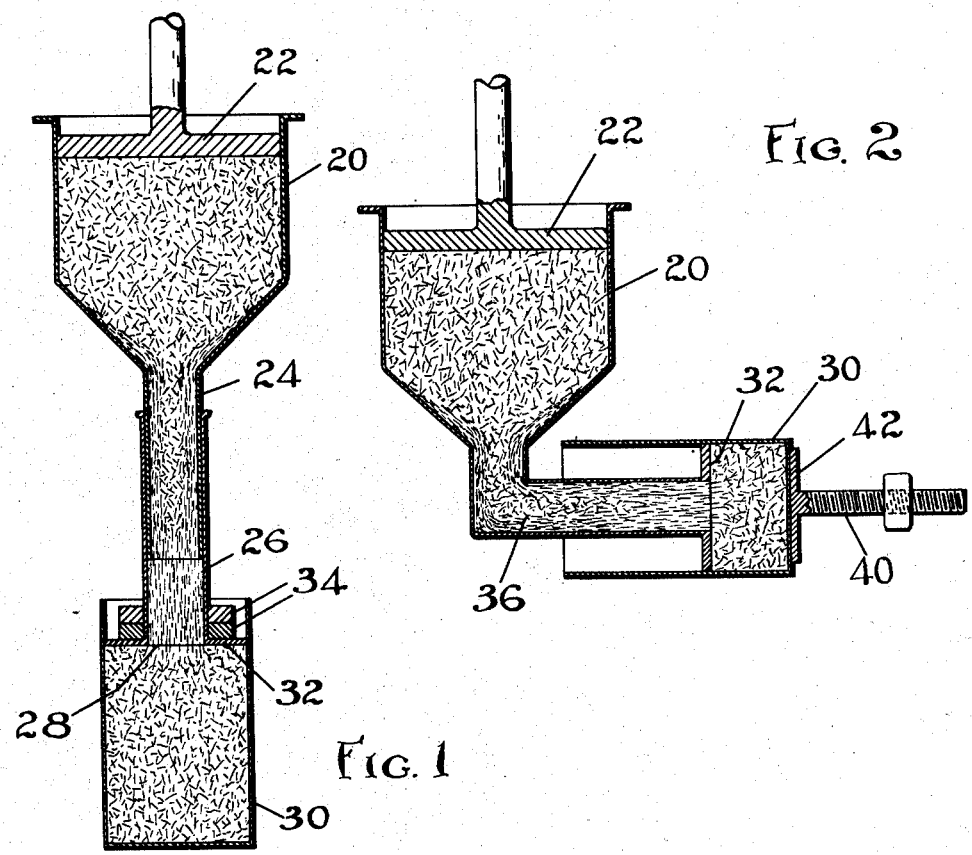
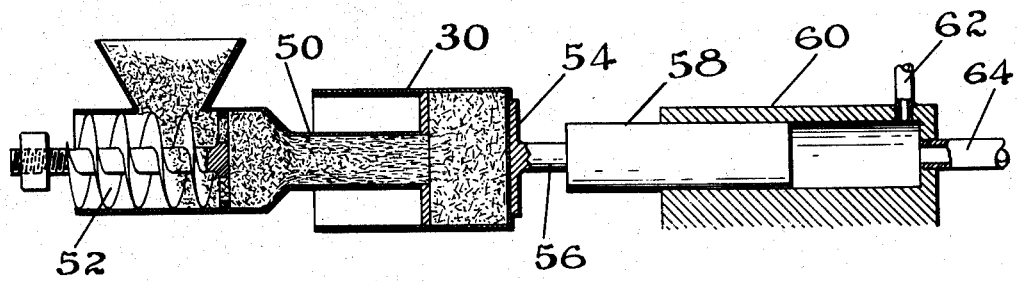
INVENTORS.
Thomas F. Banigan
Omar E. Snyder
BY
ATTORNEY.

Patented Apr. 14, 1942

2,280,022

UNITED STATES PATENT OFFICE 2,280,022

METHOD AND APPARATUS FOR MOLDING CELLULOSIC STRUCTURES

Thomas F. Banigan, Kenmore, and Omar E. Snyder, Buffalo, N. Y., assignors to E. I. du Pont de Nemours & Company, Wilmington, Del., a corporation of Delaware Application June 15, 1937, Serial No. 148,320

12 Claims. (Cl. 18—30)

This invention relates to the filling of molds with plastic material. More particularly, it relates to the manufacture of artificial sponges.

In the manufacture of regenerated cellulose sponge, a pasty mass is prepared by mixing together viscose, vegetable fibers such as hemp or jute, and a soluble, pore-forming substance such as sodium sulfate decahydrate. This mixture is then placed into molds and coagulated by heat and/or the chemical action of a suitable solution. After coagulation, the pore-forming substance is melted or washed from the mass and the resulting sponge-like material is washed, dried and cut into appropriate blocks.

In the production of sponges, it is known to fill the molds with the pasty cellulosic mass by the use of a discontinuous molding or pressing apparatus such as a brick press or a continuous apparatus such as an appropriate extrusion press. It is also known to effect continuous molding by means of an extrusion press which forces the paste through a nozzle opening, into a tube which is cold at the inlet but is suitably heated at the other end. In this tube the mass is progressively coagulated at least superficially.

When sponge masses are formed by these processes, it is found that the constituents do not remain well mixed with the fibers and crystals lying at random in all directions but that an orientation or stratification of the fibers and of the salt crystals used in the pore-forming substance takes place along certain well-defined lines or planes. This results in planes of weakness, or a graining effect comparable to the grain of wood. The orientation is very noticeable in the case of continuous molding by means of an extrusion press. In some instances, it is found that the strength in the direction of the grain where the fibers are intermatted is three times that across the grain where there is relatively little interlocking of the fibers. The blocks obtained by the discontinuous molding process possess a less pronounced, but still manifest orientation of the constituents along definite lines or planes.

It is therefore an object of this invention to produce sponge structures including the extrusion of sponge masses in which the resulting sponges will not possess an objectionable orientation of constituents.

Another object is to produce sponges of regenerated cellulose, including the extrusion of cellulosic sponge masses, which shall possess substantially uniform tensile strength in all directions.

A further object is to provide an improved extrusion apparatus for filling sponge molds in one operation.

A still further object is to provide extrusion nozzles that will function to remix a sponge mass in which fibers and crystals have become oriented along definite lines or planes.

Other objects will appear hereinafter.

These objects are accomplished, in general, by breaking up the alignment of fibers, or in other words, disrupting the orientation of the fibers which results from the passing of a plastic fiber-containing composition through a straight conduit of substantially uniform cross section.

The invention will be more readily apparent by reference to the following detailed description taken in connection with the accompanying illustrations, in which;

Figure 1 is a diagrammatic sectional view of an extrusion device for filling a mold with a plastic composition.

Figure 2 is a diagrammatic sectional view of a modified form of extrusion device for filling molds.

Figure 3 is a diagrammatic sectional view of another modified form of the invention.

Figures 4 to 12 inclusive are diagrammatic sectional views of specific forms or modifications of mouth pieces or nozzles to be used for extruding a plastic composition into a mold.

In the practice of our invention, we first produce a pasty mass by mixing together a viscose solution, crystals of sodium sulfate decahydrate, and vegetable fibers. The viscose solution that we prefer to use contains between 5 and 10% of cellulose and is prepared by xanthating alkali cellulose. Crystals of sodium sulfate decahydrate of the appropriate size or range of sizes to give the desired pore structure are incorporated in an amount sufficient to form between 50 and 90% by weight of the total sponge mixture. Where it is desired to produce sponges of very fine porosity, a portion of this pore-forming substance may be in the form of an anhydrous powder. The fibers used may consist of fibers of jute, hemp, etc., between 0.5% and 3.0% of the total sponge mixture.

Figure 4:
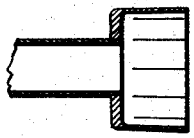

This mixture, after being stirred and kneaded to a uniform consistency, is transferred to the hopper 20 of an extrusion apparatus such as is depicted in Figure 1. The sponge mixture in the hopper 20 is forced under pressure of the piston 22 through the dies or conduits 24 and 26 and nozzle 28 into the mold 30. The extrusion nozzle 28 is of considerably smaller diameter than the mold 30. Attached to the end of the nozzle 28 is a flange 32 which conforms in shape and size to the interior dimensions of the mold. The mold 30 is tubular and may be of circular, oval, square or any other cross section. The cross section of the nozzle 28 and conduits 24 and 26 may be circular or be of any other shape and does not have to conform to the cross section of the mold. The flange 32 may be equipped with an expansible skirt as shown in Figure 4 which serves to prevent the leakage of sponge mass around the flange. The mold to be filled is open at one end and closed at the other. It is slipped over the nozzle 28 and flange 32 until the flange 32 rests against the bottom of the mold. As pressure is applied to the sponge mass by the piston 22, the conduit 26, which is telescopically positioned on conduit 24 is pushed upwardly due to the back pressure on the flange. In order to apply the desired amount of pressure on the sponge mass in the mold, it may be desirable to place suitable weights 34 on the top of the flange 32. The pressure applied may be between 5 and 200 pounds per square inch, or sufficient to produce a compact mass in the nozzle and mold. The pressure applied by the piston 22 will cause the expulsion of most of the entrapped air in the mass and the advancement of the sponge mass into the mold. When the sponge mass completely fills the mold, the latter is removed from the press and is immersed in a boiling salt solution, or any other environment that will cause the viscose solution to coagulate or set. When the coagulation process is sufficiently advanced, the pore-forming material is removed by melting or solution, and the sponge material, removed from the mold, is washed, dried and/or subjected to other finishing treatments and then cut into suitable blocks. If desired the purification operations may be carried out in the mold. The following example will further illustrate the method.

*Example*

To a quantity of viscose is added Glauber's salt crystals and jute fibers in proportions to give a pasty mass such as is well known in the art for use in the production of artificial sponges. The mass is thoroughly mixed in a suitable mixing machine.

The Glauber's salt-viscose-jute mixture is then charged into the cylinder of an hydraulic press. A tubular mold of 5" inside diameter, closed at one end, is then forced over the flanged end of the discharge pipe so that the flanged end extends to the bottom of the mold. The flange is weighted so that the weight together with the friction between conduits 24 and 26 will necessitate the application of 20 lbs. per square inch pressure to lift the same. Pressure is applied to piston 22 by means of an hydraulic press or other mechanism in an amount sufficient to lift members 26, 32 and 34. The pressure on piston 22 is released when the mold has been filled to the desired depth, after which the filled mold is removed and placed in a tank containing a 15% sodium sulfate solution at 95° C.

The filled mold is kept immersed in a hot sodium sulfate solution for 6 hours. During this treatment, the viscose is coagulated and the pore-forming crystals are melted and dissolved. At the end of this operation the molds are removed from the coagulating tank and allowed to drain free from excess of dissolved sodium sulfate solution. The sponge blocks are then withdrawn from the molds, after which they are washed, bleached and purified. The blocks are then dried for 24 hours at 90° C., after which they are cut into slices of the desired thickness.

The product obtained by this process will be found to have substantially uniform tensile strength in all directions and will exhibit no appreciable predisposition to tear in one direction over any other direction. Neither will any specific planes of weakness be apparent.

Referring to the modification of the invention illustrated in Figure 2 of the drawings, reference numeral 20 designates a cylindrical container, and 22 a piston for forcing a sponge mass through container 20. The container 20 is provided with a conduit 36 at the end of which is positioned a flange 32. The flange 32 fits snugly into the mold 30. The conduit 36 and flange 32 are stationary, and the mold 30 is pushed onto the flange until the latter touches the bottom of the mold. A threaded shaft 40 having a flat supporting member 42 is then positioned firmly against the outer bottom surface of the mold. As the piston 22 forces the sponge mass into the mold through the flanged conduit, the supporting member 42 is gradually moved back by means of the threaded shaft until the mold is filled. The speed at which the member 42 is moved back is correlated to the force and speed of movement of piston 22 so that the sponge mass will be forced into the mold at a desirable pressure. The orientation of the fibers in the sponge mass as shown in Figure 2 illustrates the necessity for remixing or disorienting the same as the mass is placed in the mold. The fibers in the sponge mass in container 20 are in complete random orientation, but as the mass is forced through conduit 36 the fibers, due to friction of the sidewalls, are caused to be oriented longitudinally of the side walls. Since the conduit 36 is considerably smaller than the mold 30, the sponge mass is forced in all directions to fill the space between the flange and the bottom of the mold, and thereby again places the fibers into complete random orientation in the sponge mass.

In the modification of the invention shown in Figure 3, the sponge mass is forced into conduit 50 by means of a screw conveyor 52. The mold 30, as it is filled, is forced back against a member 54 which is carried by a piston shaft 56. The piston 58 on shaft 56 is forced into cylinder 60 which contains a gas or a liquid. The liquid or gas can be forced from the cylinder through a release valve 62 under a controlled pressure. The cylinder 60 can be refilled by means of conduit 64 thereby causing the piston shaft to be moved against an empty mold.

Figure 5:
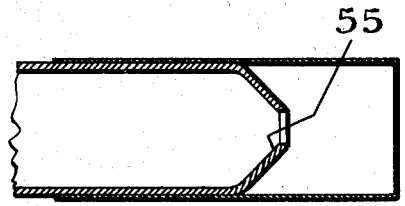
Figure 6:
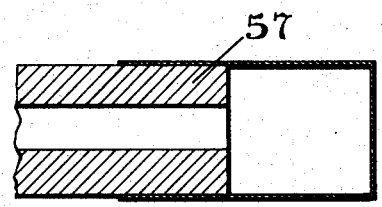
Figure 7:
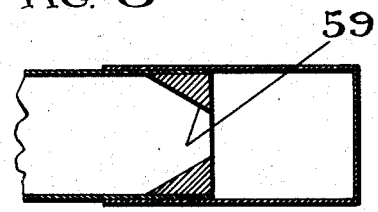

In Figure 5 is shown an extrusion nozzle that has been constricted at the orifice 55 so that the sponge mass traveling therethrough will be caused first to contract and then to expand sharply just beyond the orifice; this contraction and expansion will effectively serve to break up any undesirable orientation of fibers and salt crystals which has occurred on passage through the conduit. Instead of the small diameter conduit and nozzle depicted in Figure 1, a conduit and nozzle 57 of heavy walled material may be used as shown in Figure 6. A combination of the nozzles shown in Figures 5 and 6 may be obtained by inserting a cone shaped ring 59 into the end of a thin walled nozzle as shown in Figure 7.

Figure 8:
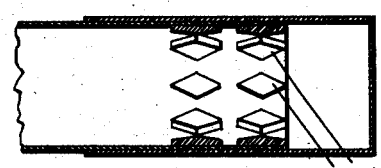

Small protuberances 61 of various shapes and sizes may be used on the interior surface of the nozzle which will serve to divert the flow of sponge mass, causing a disorientation; this is shown in Figure 8.

Figure 9:
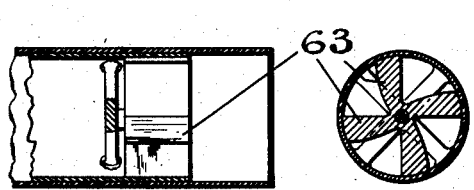

In addition to the expansion of the material upon extrusion, a circular motion may be given to the mass by introducing a series of vanes 63, placed at an angle to the direction of flow, as shown in Figure 9.

Figure 10:
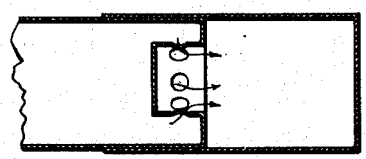
Figure 11:
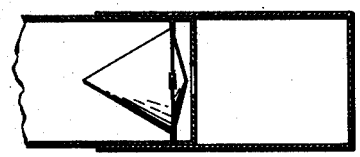
Figure 12:
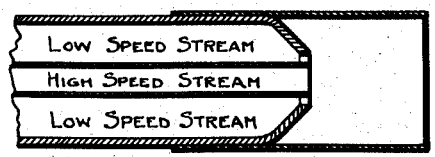

Two or more streams of oriented material may be formed and recombined so as to produce a stream of disoriented material. Apparatus for producing this effect are shown in Figures 10, 11 and 12.

Many types of sponge mixtures are known to the art, employing different pore-forming materials, different fibrous materials and different concentrations of viscose solution. This invention is not limited to the particular materials or compositions of the example, but applies broadly to all suitable mixtures known to the art.

While we do not wish to be limited by any theory, the following explanation may assist in an understanding of the invention. The pasty mass from which the sponges are formed consists of a large number of fibers such as jute or hemp which are cemented or joined together by cellulose regenerated from the viscose solution. The matting together of these fibers produces great strength in the finished article. When the distribution and orientation of these fibers are completely random, the most uniform strength is obtained in all directions and throughout the mass. In a similar manner a perfectly random distribution of salt crystals or other pore-forming substances will cause a maximum uniformity in sponge strength.

Now, it may readily be seen that the uniform motions of the paddles of a mixing machine will tend to arrange the fibers and particles in some given orientation. That is, they will tend to point in some one direction, and hence, there will be little or no intermatting in a direction transverse to the fibers. The strength of the material in the transverse direction therefore will be the strength of the bonding material, unassisted by fibers. When the pasty mass flows through a tube such as the conduits above described, a similar force is active. This is because of the drag upon the material of the side walls of the conduits, causing a transverse distribution of velocities in said conduits. The faster moving, central portions tend to sweep the fibers around until they are aligned with the direction of flow. A similar alignment of fibers will be caused by a gradual constriction, for example, a conical constriction, in the conduit. The material with fibers so aligned will exhibit marked differences in physical properties when measured in different directions. However, if different portions of this material are abruptly caused to take different directions of flow, this oriented structure may be broken up and the fibers once more intermingled, giving a uniformly homogeneous substance.

The method of producing sponges in accordance with the present invention has many advantages over methods previously used. It produces a sponge which has high tensile strength in all directions and uniformity throughout the mass. Sponges produced heretofore by extrusion processes were characterized by planes of weakness, or weakness in one general direction which caused them to tear or break readily, when put to hard usage and thus made them unsuitable for scrubbing operations. The present invention involves a process for filling sponge molds which is both time- and labor-conserving. The method and apparatus above described are readily adaptable to sponges of different cross sections since the flanges may be made demountable so that one flange is readily replaced by another, without requiring a change of conduits. The length of the flange between the conduit and the mold must however not be too long since an undesirable orientation of fibers may take place if there is a decided flow along the flange surface. It is very difficult to avoid, in various states of the preparation of the sponge material, certain influences that will serve to orient these fibers and other particles. By using the extrusion method of this invention, it becomes unnecessary to take any steps towards the avoidance of such influences since the final stage preparatory to the coagulation of the mass will entirely counteract any adverse effects that result from such influences. This means a great saving of time and expense in circuitous methods for the avoidance of such influences. Furthermore, the process itself represents the most convenient method of introducing such masses into molds.

Sponges produced in accordance with the present invention, due to their uniformity of texture, are superior for all generally known uses of sponges. They may, for example, be used for general cleansing purposes, such as for personal cleansing in the bath, for shampooing and treatment of the scalp, for the application of ointments and tonics to the scalp and skin, for washing wounds and sores, for washing animals, for use as hot and cold compresses, for cleaning windows and mirrors, for cleaning painted surfaces and walls, for calcimine removal, for cleaning kitchen and lavatory fixtures, for washing dishes and laboratory ware, for cleaning surgical and dental implements, for cleaning guns, for cleaning gasoline and oil dispensing equipment, for wiping and cleaning rayon spinning apparatus, for cleaning "Ditto" machines, for cleaning tools and machine parts with gasoline, for wiping off lithographic and offset printing rolls and plates, for cleaning and washing photographic plates and films, for cleaning rugs, upholstery and fabrics, for cleaning and reblocking hats, for brushing clothes, for cleaning and polishing footwear and leather goods, for cleaning furniture, for scrubbing tables, for mopping up liquids spilled on bars or soda fountains, for cleaning blackboards, for washing vehicles, for cleaning the hulls of yachts and boats, for use with paint removers in the removal of old finish, for use in the polishing of granite and for use in the cleaning of vegetables.

This sponge material may be mounted to produce various cleaning implements, such as mops, toothbrushes, shaving brushes, bottle brushes, windshield wipers and pen wipers.

As an absorbent medium for purposes other than cleaning, it will be found satisfactory as an absorbent in dynamite, as an implement for dampening clothes, as drip absorbent rings around the necks of bottles, as surgical and medical packings of all sorts, for sweatbands for use upon the forehead, for the necks and cuffs of raincoats, for baby diapers, for sanitary pads, as absorbent rolls for dental work, for pads under flower pots and plants, as moisteners in tobacco humidors, for absorbing blood during operations, for cigarette filters and pipe filters, for distributing inks and solutions in presses and similar apparatus, for removing water in gasoline, for bailing out small boats.

Suitably impregnated with various materials this sponge substance may serve for the polishing of silver, brass and other metal ware, for applying size to walls and wall-boards, as an adhesive applicator, as waxing pads, as chemically treated pads for cleaning and dusting, as pads for applying French finish, as wicks in lamps, candles, etc., and as a base for insect attracting adhesives. It may be impregnated with an abrasive and used as a wet sanding tool or it may be impregnated with paraffin, etc., and used as a convenient portable fuel, or it may be impregnated with insect poisons and fumigants. It may be combined with latex or otherwise treated to form an artificial cork for life belts, etc. It may be used for the greasing of griddles and frying pans and as a dauber for applying shoe polish, etc. It may be used for buffing and polishing wheels or when impregnated with suitable abrasives, as a grinding wheel. It may be used as a support for activated carbon in solvent recovery systems, or as a support for various other chemical reagents This material is also satisfactory for use as a resilient filling and stuffing medium, such as padding under rugs, for shot shell wadding, for packing the hoofs of race horses, for caulking boats, for stuffing cracks of buildings, for weatherstrippings, as a means of preventing rattling of windows, etc., as thermal and sound insulation material, for the stuffing of furniture, cushions and seat pads, as a baffle in glycerin filled pressure gauges, as a vibration absorber, to control weight in lighter-than-air craft, as a stuffing in taxidermy, for doll bodies, as a packing medium for explosives and fragile articles, as a journal packing, and as gaskets.

This material may be bleached or dyed and cut into ornamental shapes and objects, it may be used for inner soles for shoes, as a filtering medium for liquids or gases, as an oil filter cartridge, for bath mats, and as a substitute for moss. It may be used in gas masks and in loud speakers, for corn plasters, as a joiner for concrete work and as a paint stippler. It may be used as a moistening instrument for stamped envelopes and gummed surfaces, for massaging and treatment pads, for a growth medium for bacteriological cultures, as stoppers in flasks and bottles, as an implement for applying decalcomanias, and for use in the manufacture of shoes.

Since it is obvious that many changes and modifications can be made in the method and apparatus above described without departing from the nature and spirit of the invention, it is to be understood that the invention is not to be limited by the description or illustrations except as set forth in the appended claims.

We claim:

1. A method for the molding of a pasty sponge mass comprising essentially an intimate mixture of viscose, fibrous material and pore-forming material, said solid materials being subject to objectionable orientation when said mass is forced along a continuous surface, which comprises extruding the pasty mass along a helical path and through a conduit into a mold, compressing the pasty mass after it leaves the helical path but before it leaves the conduit to enter the mold, changing the direction of flow of the pasty mass as it passes from the conduit, and collecting the pasty mass in the mold in such a manner as to prevent substantial flow of the pasty mass along the walls of the mold, whereby objectionable orientation of the solid materials in the pasty mass is avoided.

2. A process for molding a pasty sponge mass of viscose containing fibrous material and pore-forming material which become objectionably oriented when the said mass is forced along a continuous surface, said process comprising forcing the pasty mass in a continuous stream along a helical path, continuously compressing the helically aligned mass after it leaves said helical path, continuously forcing said compressed mass along an unobstructed linear path, continuously disrupting the orientation of the fibrous material and pore-forming material in the forced mass and collecting the resultant mass in a mold in such a manner that the said resultant mass does not move along the sides of the mold.

3. In a method for the molding of a plastic sponge mass comprising viscose containing fibrous material, the steps comprising extruding the plastic mass with a screw conveyor through a conduit having a constricted section into a cylindrical mold fitting telescopically over said conduit, withdrawing the said mold as the plastic sponge mass is collected therein in such a manner as to prevent substantial flow of the said sponge mass along the walls thereof while it is being filled, and disrupting the path of flow of the plastic mass as it passes from the conduit into the mold, whereby objectionable orientation of the fibrous material is prevented.

4. In a method for the molding of a plastic sponge mass comprising essentially viscose, fibrous material and pore-forming material, the steps comprising extruding the plastic mass with a screw conveyor through a tapered nozzle into a conduit which causes alignment of the fibrous material and pore-forming material into a mold fitting telescopically over said conduit, disrupting the path of flow of the plastic mass as it passes from said conduit to said mold, and providing for a relative movement between said conduit and said mold to prevent substantial flow of the mass along the walls of the mold, whereby objectionable orientation of the fibrous material will be substantially reduced.

5. In an apparatus for molding a plastic mass of sponge forming viscose containing fibrous material which is subject to objectionable orientation when said mass is forced along a continuous surface, a conduit which causes alignment of the said fibrous material, a cylindrical mold telescopically mounted on said conduit, means for imparting an abrupt change in direction of movement of said mass as it leaves said conduit and enters said mold, screw conveyor means for transporting and forcing said mass through said conduit against the internal bottom of said mold, said mold and said screw conveyor means being located at opposite ends of said conduit, and means regulating the relative telescopic movement of the conduit and the mold during the filling of the mold, whereby the sponge mass in the mold is prevented from moving along the sides thereof.

6. In an apparatus for molding a plastic mass of sponge forming viscose containing fibrous material which is subject to objectionable orientation when said mass is forced along a continuous surface, a conduit whose major portion is of uniform cross-section which causes alignment of the said fibrous material, a cylindrical mold telescopically mounted on said conduit, means for imparting an abrupt change in direction of movement of said mass as it leaves said conduit and enters said mold, screw conveyor means for transporting and forcing said mass through said conduit, said mold and said screw conveyor means being located at opposite ends of said conduit, said conduit having a tapered section near the screw conveyor for compacting sponge material after it leaves the screw conveyor, and means for controlling the relative movement between said conduit and said mold as said mold is filled, whereby the sponge mass is maintained in the position in the mold resulting from the aforesaid change in direction as it leaves the conduit.

7. In an apparatus for molding a plastic mass of sponge forming viscose containing fibrous material which is subject to objectionable orientation when said mass is forced along a continuous surface, a conduit which causes alignment of the said fibrous material, a cylindrical mold telescopically mounted on said conduit, said conduit having materially smaller cross section than said mold and a flange having an external periphery which fits snugly within said mold, means for imparting an abrupt change in direction of said mass as it leaves said conduit and enters said mold, screw conveyor means for transporting and forcing said mass through said conduit, said mold and said screw conveyor means being located at opposite ends of said conduit, and means for controlling the relative movement between said conduit and said mold as said mold is filled, whereby the sponge mass is maintained in the position in the mold resulting from the aforesaid change in direction as it leaves the conduit.

8. In an apparatus for molding a plastic mass of sponge forming viscose containing fibrous material which is subject to objectionable orientation when said mass is forced along a continuous surface, a conduit which causes alignment of the said fibrous material, a cylindrical mold telescopically mounted on said conduit, said conduit having an outlet opening materially smaller in cross section than the internal cross section of said conduit for imparting an abrupt change in direction of movement of said mass as it leaves said conduit and enters said mold, screw conveyor means for transporting and forcing said mass through said conduit against the internal bottom of said mold, and means regulating the relative telescopic movement of the conduit and the mold during the filling of the mold, whereby the sponge mass in the mold is prevented from moving along the sides thereof.

9. In an apparatus for molding a plastic mass of sponge forming viscose containing fibrous material which is subject to objectionable orientation when said mass is forced along a continuous surface, a conduit which causes alignment of the said fibrous material, a cylindrical mold telescopically mounted on said conduit, a constriction orifice within said conduit for imparting an abrupt change in direction of movement of said mass as it leaves said conduit and enters said mold, screw conveyor means for transporting and forcing said mass through said conduit against the internal bottom of said mold, and means regulating the relative telescopic movement of the conduit and the mold during the filling of the mold, whereby the sponge mass in the mold is prevented from moving along the sides thereof.

10. In an apparatus for molding a plastic mass of sponge forming viscose containing fibrous material which is subject to objectionable orientation when said mass is forced along a continuation when said mass is forced along a continuous surface, a conduit which causes alignment of the said fibrous material, a cylindrical mold telescopically mounted on said conduit, subdivided means for subdividing the plastic mass while it flows through said conduit, and means for imparting an abrupt change in direction of movement of said mass as it leaves said conduit and enters said mold, screw conveyor means for transporting and forcing said mass through said conduit against the internal bottom of said mold, said mold and said screw conveyor means being located at opposite ends of said conduit, and means regulating the relative telescopic movement of the conduit and the mold during the filling of the mold, whereby the sponge mass in the mold is prevented from moving along the sides thereof.

11. In the process of producing regenerated cellulosic sponge in which a pasty cellulosic sponge forming mass containing fibers is pressed into a mold and coagulated therein, the steps of forcing the pasty cellulosic mass along a spiral path, through a constriction into a conduit which places it in the mold, breaking up the alignment of the fibers as the mass enters the mold, and coagulating the sponge forming mass while maintaining the fibers in the broken-up alignment arrangement.

12. Molding apparatus comprising a tubular nozzle, a mold telescopically mounted thereon, said nozzle adapted to introduce the material to be molded into the mold, screw conveyor means to force the material to be molded through said nozzle into the mold, said mold and said screw conveyor means being located at opposite ends of said tubular nozzle, the said nozzle cross-sectional area being smaller than the mold cross-sectional area, means secured to the nozzle for closing the space between the nozzle exit and the surrounding portion of the mold whereby the mold and nozzle together with said space closing means move relative to each other and the direction of the material entering the mold through the nozzle is abruptly changed but is not permitted to move materially along the sides of the mold, said nozzle being unobstructed for a portion of its length adjacent and preceding its exit, said unobstructed portion being of sufficient length to cause alignment of fibers occurring in the material being molded, and means connecting the nozzle and screw conveyor housing for compacting the mass as it passes from the screw conveyor housing into the nozzle.

THOMAS F. BANIGAN.
OMAR E. SNYDER.